United States Patent
Karimli et al.

(10) Patent No.: US 10,064,113 B2
(45) Date of Patent: Aug. 28, 2018

(54) METHOD AND APPARATUS FOR MIGRATING FROM LICENSED SPECTRUM TO UNLICENSED SPECTRUM

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/396,089

(22) Filed: Dec. 30, 2016

(65) Prior Publication Data

US 2018/0192340 A1    Jul. 5, 2018

(51) Int. Cl.
*H04W 36/14* (2009.01)
*H04W 48/16* (2009.01)
*H04B 17/336* (2015.01)
*H04W 36/30* (2009.01)
*H04W 16/14* (2009.01)
*H04W 84/12* (2009.01)

(52) U.S. Cl.
CPC .......... *H04W 36/14* (2013.01); *H04B 17/336* (2015.01); *H04W 16/14* (2013.01); *H04W 36/30* (2013.01); *H04W 48/16* (2013.01); *H04W 84/12* (2013.01)

(58) Field of Classification Search
CPC ..... H04W 36/14; H04W 48/16; H04W 16/14; H04W 36/30; H04W 84/12; H04B 17/336
See application file for complete search history.

(56) References Cited

U.S. PATENT DOCUMENTS

| | | | |
|---|---|---|---|
| 2010/0151858 A1* | 6/2010 | Brisebois | H04W 24/10 455/434 |
| 2015/0111598 A1* | 4/2015 | Azami | H04W 64/00 455/456.1 |
| 2015/0141027 A1 | 5/2015 | Tsui et al. | |
| 2016/0029295 A1* | 1/2016 | Nagasaka | H04W 48/18 370/237 |
| 2016/0057651 A1 | 2/2016 | Backholm et al. | |

(Continued)

OTHER PUBLICATIONS

Office action for U.S. Appl. No. 14/849,036, dated Sep. 9, 2016, Anderson et al., "Coverage Solution Recommendation Tool," 10 pages.

(Continued)

*Primary Examiner* — Kwang B Yao
*Assistant Examiner* — Moo Ryong Jeong
(74) *Attorney, Agent, or Firm* — Lee & Hayes, PLLC

(57) ABSTRACT

The systems, devices, and methods discussed herein are directed to migrating user equipment (UE) communication from an initially assigned channel in a licensed spectrum to an unlicensed spectrum available in a neighboring cell. As the UE is powered on, data connectivity between the UE and a carrier cell is checked, and if connected, an available neighbor cell in an unlicensed spectrum may be searched. If an available neighbor cell in the unlicensed spectrum is found, the carrier cell may hand off UE communication to the available neighbor cell in the unlicensed spectrum based on a type of the available neighbor cell and available quality for communication in the unlicensed spectrum.

15 Claims, 5 Drawing Sheets

(56) References Cited

U.S. PATENT DOCUMENTS

2016/0068264 A1 3/2016 Ganesh et al.
2016/0191142 A1 6/2016 Boss et al.
2017/0070898 A1 3/2017 Anderson et al.

OTHER PUBLICATIONS

Office action for U.S. Appl. No. 14/849,036, dated Apr. 25, 2017, Anderson et al., "Coverage Solution Recommendation Tool", 12 pages.
Office action for U.S. Appl. No. 14/849,036, dated Sep. 6, 2017, Anderson et al., "Coverage Solution Recommendation Tool", 14 pages.

* cited by examiner

METHOD AND APPARATUS FOR MIGRATING FROM LICENSED SPECTRUM TO UNLICENSED SPECTRUM

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, LTE in Unlicensed Spectrum (LTE-U), Licensed Assisted Access (LAA), and Evolved High-Speed Packet Access (HSPA+) are examples of 4G telecommunications technologies.

As the demand for data increases for usage such as emails, texts, instant messages, voice over Internet Protocol (VoIP), video chat, video and music streaming, location assistance, and the like, communication channels used in the licensed spectrum for a carrier may experience congestion. For a mobile device, or user equipment (UE), capable of operating in an unlicensed spectrum, it may be desirable to switch from fully operating in the licensed spectrum of the carrier to operating in an unlicensed spectrum of a neighboring cell to increase coverage and to decrease data usage in the licensed spectrum of a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and methods discussed herein are directed to migrating user equipment (UE) communication from an initially assigned channel in a licensed spectrum to an unlicensed spectrum available in a neighboring cell. As the UE is powered on, data connectivity between the UE and a carrier cell is checked, and if connected, an available neighbor cell in an unlicensed spectrum may be searched. If an available neighbor cell in the unlicensed spectrum is found, the carrier cell may hand off UE communication to the available neighbor cell in the unlicensed spectrum based on a type of the available neighbor cell and available quality for communication in the unlicensed spectrum.

Figure 1:
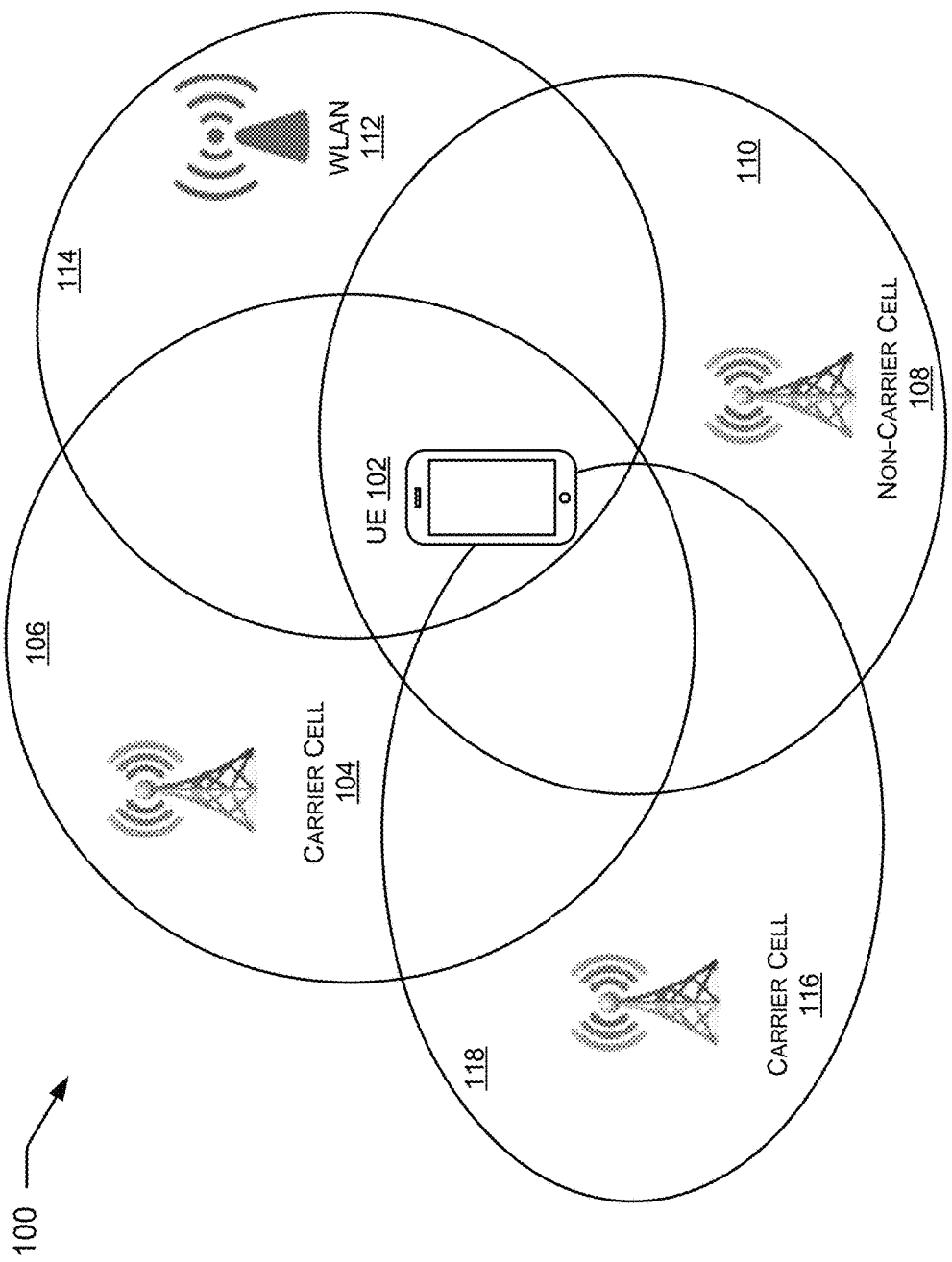
FIG. 1 illustrates an example environment in which a mobile device, or user equipment (UE) may migrate from a licensed spectrum of a carrier of the UE to an unlicensed spectrum.

FIG. 1 illustrates an example environment 100 in which a mobile device, or a user equipment (UE), may migrate from a licensed spectrum to an unlicensed spectrum.

A user equipment (UE) 102 may be a portable communication device, such as a cellular telephone, a tablet or laptop computer, a global positioning system (GPS) device, a game device, and the like, and may be located within coverage areas of several communication cells. The UE 102 may be registered and in communication with a carrier cell 104, which may be a node B, having a coverage area 106 using a licensed network spectrum. The UE 102 may also be capable of communication in an unlicensed spectrum. The UE 102 may be located within a coverage area of a non-carrier cell 108 having a coverage of 110, and also within a coverage area of a wireless local area network (WLAN) cell 112 having a coverage of 114. Another carrier cell 116 with a coverage area of 118 is also shown. The UE 102 may be within the coverage area 118, however, the network cell 116 may not provide a good coverage or quality compared to that of the network cell 104 as shown by the coverage area 118 partially covering the UE 102. The non-carrier cell 108, the WLAN cell 112, and the carrier cell 116 may operate in the unlicensed spectrum, and may be capable of establishing communication with the UE 102 using a channel in the unlicensed spectrum.

Figure 2:
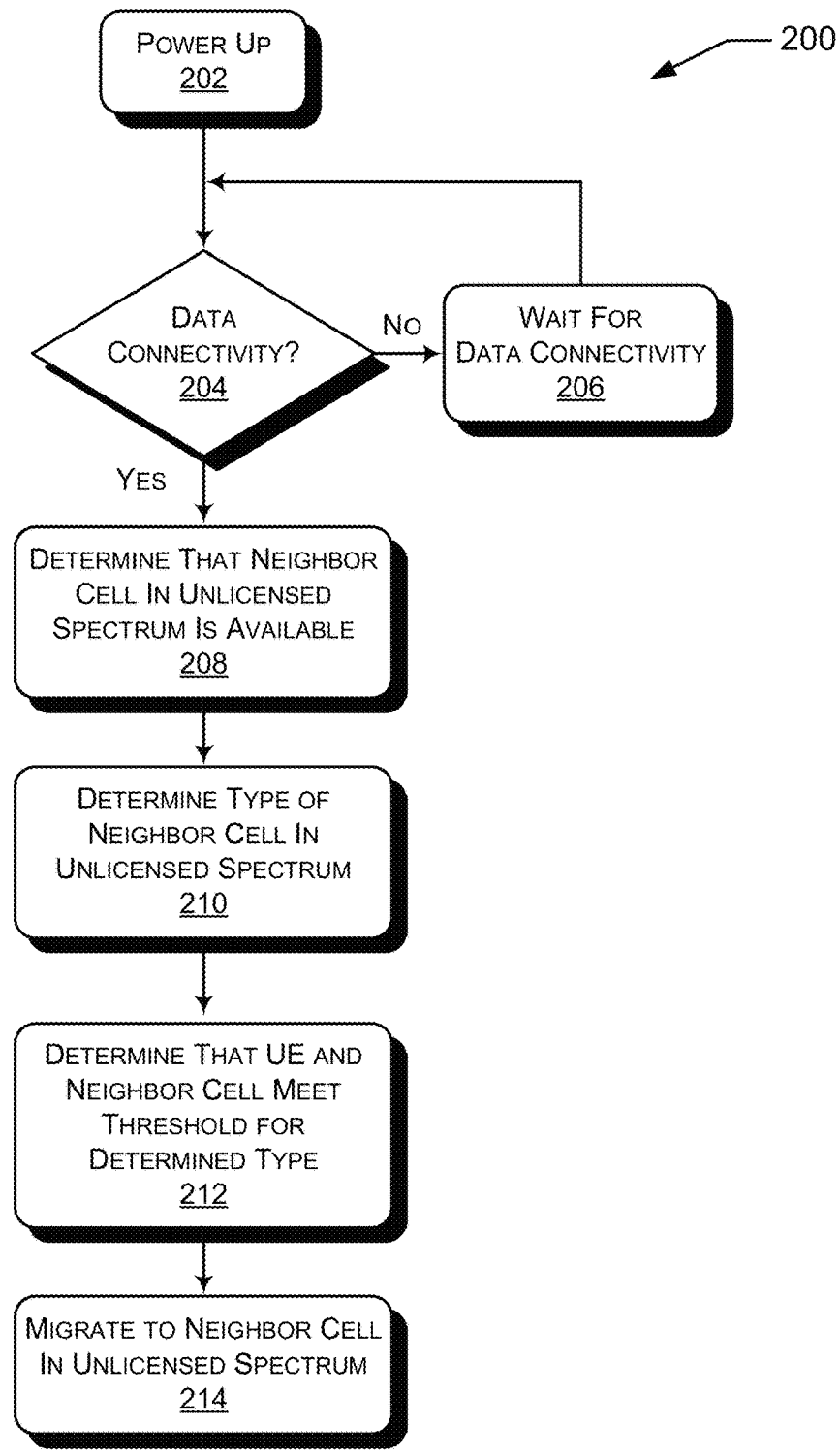
FIG. 2 illustrates an example process for the UE for migrating from the licensed spectrum of the carrier to an unlicensed spectrum.

FIG. 2 illustrates an example flow chart process 200 for the UE 102 for migrating from the licensed spectrum of the carrier to an unlicensed spectrum.

As the UE 102 is powered up in block 202, the UE 102 may check for data connectivity with a network cell, such as the carrier cell 104, in block 204. If no data connectivity is confirmed in block 204, the UE 102 may wait till data connectivity is confirmed in block 206. For example the UE 102 may repeat checking for data connectivity at a predetermined time interval for a predetermined number of times. If no data connectivity is detected after the predetermined number of times, the UE 102 may enter an inactive mode, and may scan for data connectivity at a longer interval between scans. However, if the data connectivity is confirmed in block 204, the UE 102 may scan for neighbor cells, and upon detecting a neighbor cell in an unlicensed spectrum is available in block 208, may determine a type of the available neighbor cell in block 210. For example, the detected neighbor cell may be a WLAN cell such as the WLAN cell 112 of FIG. 1, or a cell operated by a different carrier from the carrier of the UE 102 in a different unlicensed spectrum. In block 212, the neighbor cell, or the UE 102, may determine that communication between the UE 102 and the neighbor cell meets a predetermined condition corresponding to the type of the neighbor cell, and the carrier cell 104 may hand off the UE 102 to the neighbor cell, causing the UE 102 to migrate to the neighbor cell in the unlicensed spectrum in block 214. The UE 102, while using a channel in the unlicensed spectrum in the neighbor cell for data communication, may maintain a control channel in the licensed spectrum with the carrier cell such as the carrier cell 104.

Figure 3:
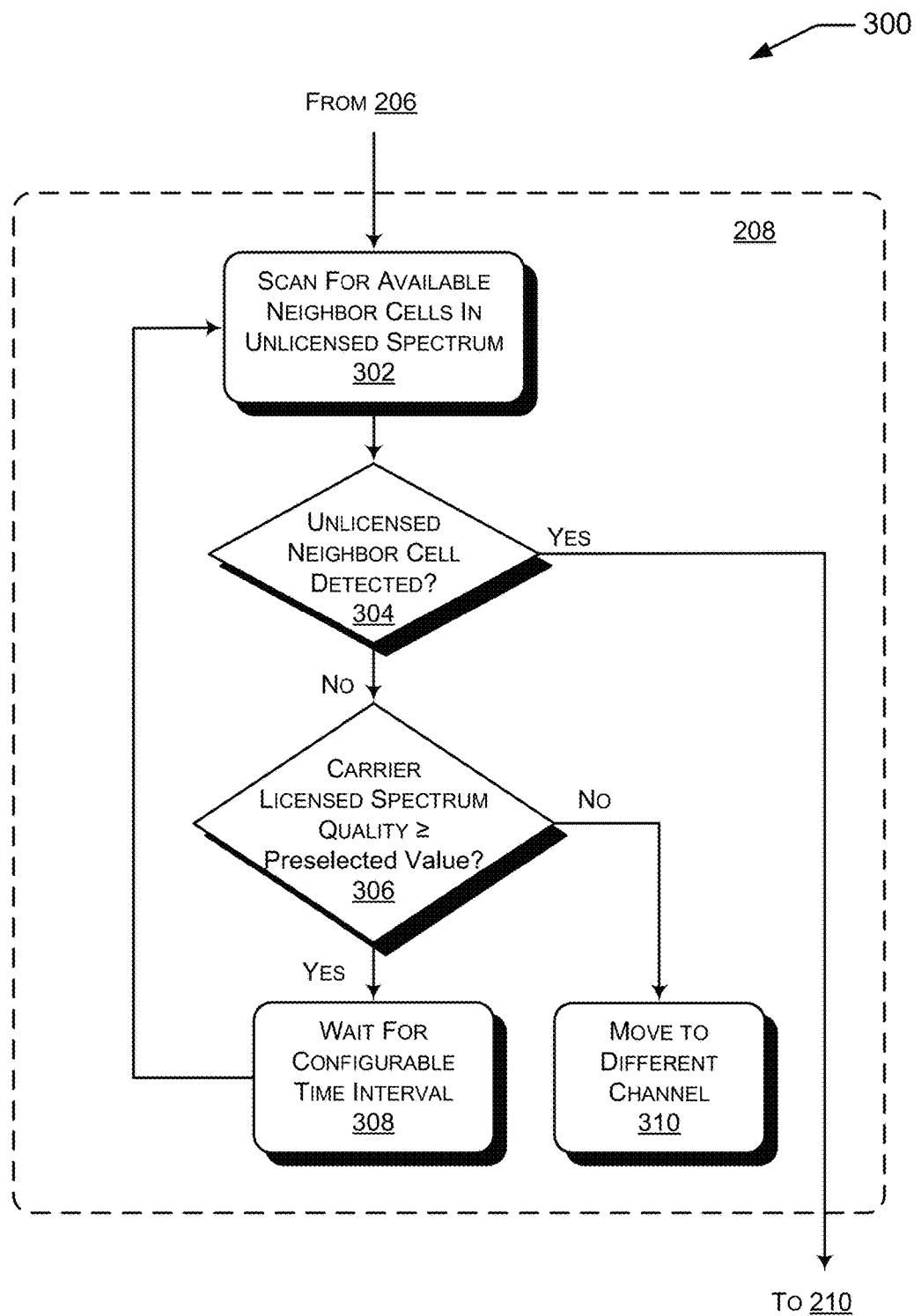
FIG. 3 illustrates an example process detailing one of the blocks of FIG. 2 for the UE to migrate from the licensed spectrum of the carrier to an unlicensed spectrum.

FIG. 3 illustrates an example process 300 detailing block 208 of FIG. 2 for the UE 102 to migrate from the licensed spectrum of the carrier to the unlicensed spectrum.

In block 302, the UE 102 may scan for neighbor cells available in the unlicensed spectrum. If the UE 102, in block 304, detects an available neighbor cell in the unlicensed spectrum, such as the non-carrier cell 108 and the WLAN 112 as illustrated in FIG. 1, the process may proceed to block 210. The detected available neighbor cells may be operable in the unlicensed spectrum of 5 GHz range, such as the unlicensed national information infrastructure (U-NII) band and the industrial, scientific and medical (ISM) band, or any other unlicensed frequency spectrum in which the UE 102 is capable of establishing data communication.

However, if the UE 102 fails to detect any available neighbor cells in the unlicensed spectrum in block 304, the UE 102 may be notified of the carrier licensed spectrum quality by the carrier through the carrier cell 104. The carrier licensed spectrum quality may be evaluated based on a signal quality, such as a signal-to-noise ratio (SNR), a received signal strength indicator (RSSI), a bit error rate (BER), and the like. The carrier licensed spectrum quality may degrade from various causes such as a data traffic congestion from a high number of users in a given area, interference created from nearby radio frequency (RF) sources such as TV and radio transmitters, presence of RF transmission close in frequency to that of the UE 102, and the like. If the carrier licensed spectrum quality is above the preselected value, indicating that there is little or no degrading issue in RF communication if the UE 102 were to remain in the licensed spectrum, the UE 102 may wait for a period of time in block 308, then repeat scanning in block 302. The wait period in block 308 may be configurable and may be set by the carrier of the UE 102 based on the environment. For example, the wait period before re-scanning may be initially set relatively short, but may be set to a longer period if no available neighbor cells are detected after a predetermined number of re-scanning, indicating that there is little to no change in the current environment surrounding the UE 102.

However, if the carrier licensed spectrum quality is below the preselected value in block 306, the carrier cell 104 may require the UE 102 to move to a different communication channel within the carrier licensed spectrum in block 310 provided that the different communication channel yields a better carrier licensed spectrum quality than the present communication channel of the UE 102.

Figure 4:
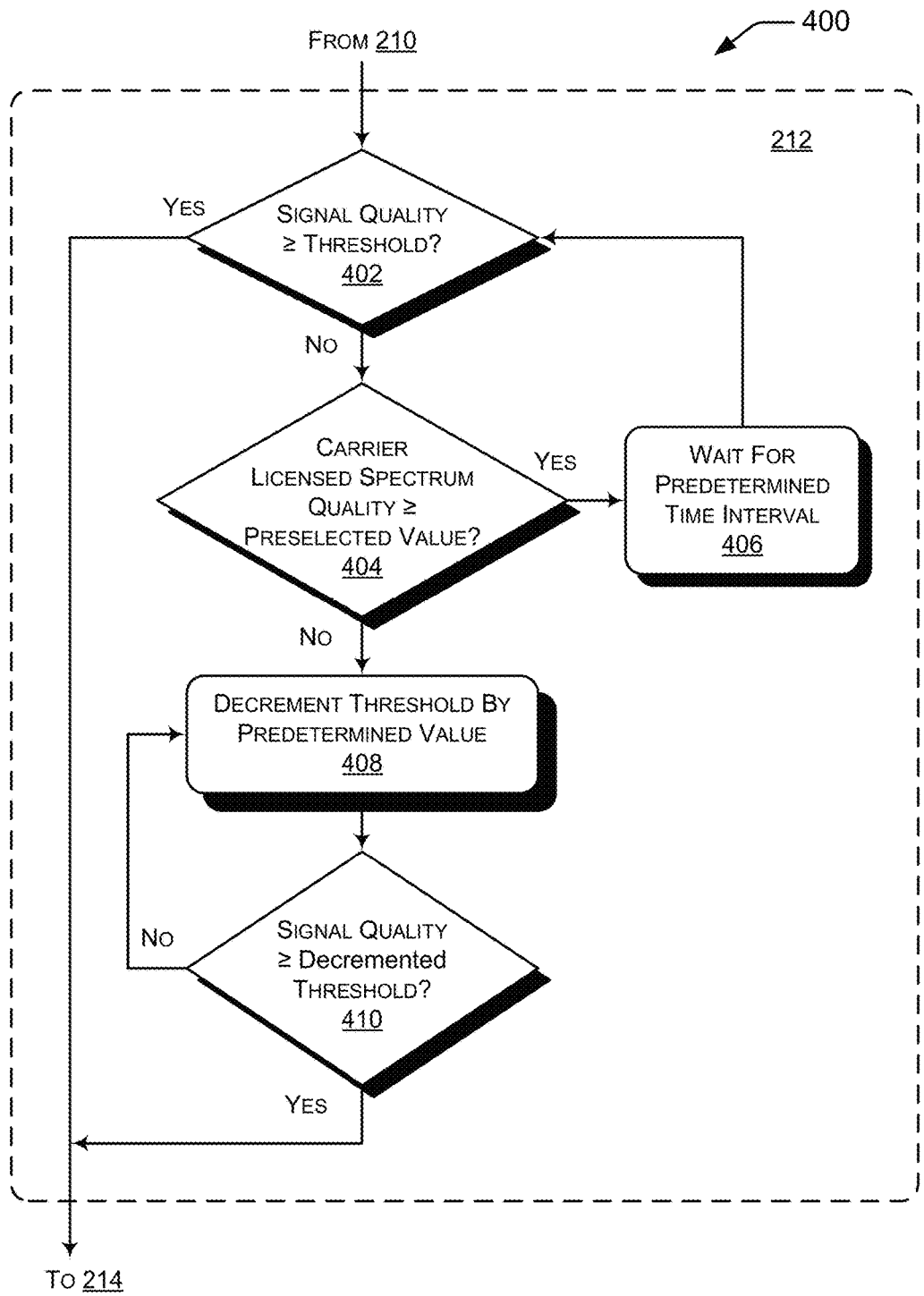
FIG. 4 illustrates an example process detailing another block of FIG. 2 for the UE to migrate from the licensed spectrum of the carrier to the unlicensed spectrum.

FIG. 4 illustrates an example process 400 detailing block 212 of FIG. 2 for the UE 102 to migrate from the licensed spectrum of the carrier to the unlicensed spectrum.

In block 402, a signal quality, such as SNR, RSSI, and BER, of communication quality between the UE 102 and the available neighbor cell in the unlicensed spectrum may be compared to a threshold value predetermined for the type of the available neighbor cell. For example, a type-specific predetermined threshold value for a WLAN cell may be different from that for a non-carrier cell operating in the same unlicensed spectrum, which itself may be different from the threshold value for a carrier cell operating in the unlicensed spectrum. The comparison may be made by the UE 102 and be reported to the carrier cell 104 for determining whether to handoff the UE 102 communication to the neighbor cell. If the signal quality of the available neighbor cell in the unlicensed spectrum is determined to be equal to or above the type-specific predetermined threshold in block 402, the process proceeds to block 214.

If the signal quality of the available neighbor cell in the unlicensed spectrum is determined to be less than the type-specific predetermined threshold in block 402, then the carrier licensed spectrum quality may be compared to the preselected value in block 404. If the carrier licensed spectrum quality is determined to be equal to or above the preselected value, indicating that there is little or no degrading issue in RF communication if the UE 102 were to remain in the licensed spectrum, the UE 102 may wait for a predetermined time interval in block 406, then repeat comparing the signal quality of the available neighbor cell in the unlicensed spectrum to the predetermined threshold value in block 402.

However, if the carrier licensed spectrum quality is determined to be less the preselected value, or the UE 102 is notified that the carrier licensed spectrum quality is less the preselected value, then the type-specific predetermined threshold for the neighbor cell in the unlicensed spectrum may be decremented by a predetermined value in block 408, indicating that it may be beneficial for the carrier licensed spectrum quality if the UE 102 were to migrate to the unlicensed spectrum even if the signal quality of the neighbor cell in the unlicensed spectrum may be less than initially desired. The signal quality of the neighbor cell may then be compared to the decremented threshold in block 410, and if the signal quality is determined to be equal to or above the decremented threshold, the process may proceed to 214. If the signal quality is determined to less than the decremented threshold, the threshold may be repeatedly decremented in block 408 and the signal quality may be compared to a new decremented threshold in block 410 until a limit for the decremented threshold is reached in block 408 indicating that the signal quality below the limit is not acceptable.

Some or all operations of the methods described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

The computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more computer storage media that, when executed by one or more processors, perform operations described above with reference to FIGS. 2-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
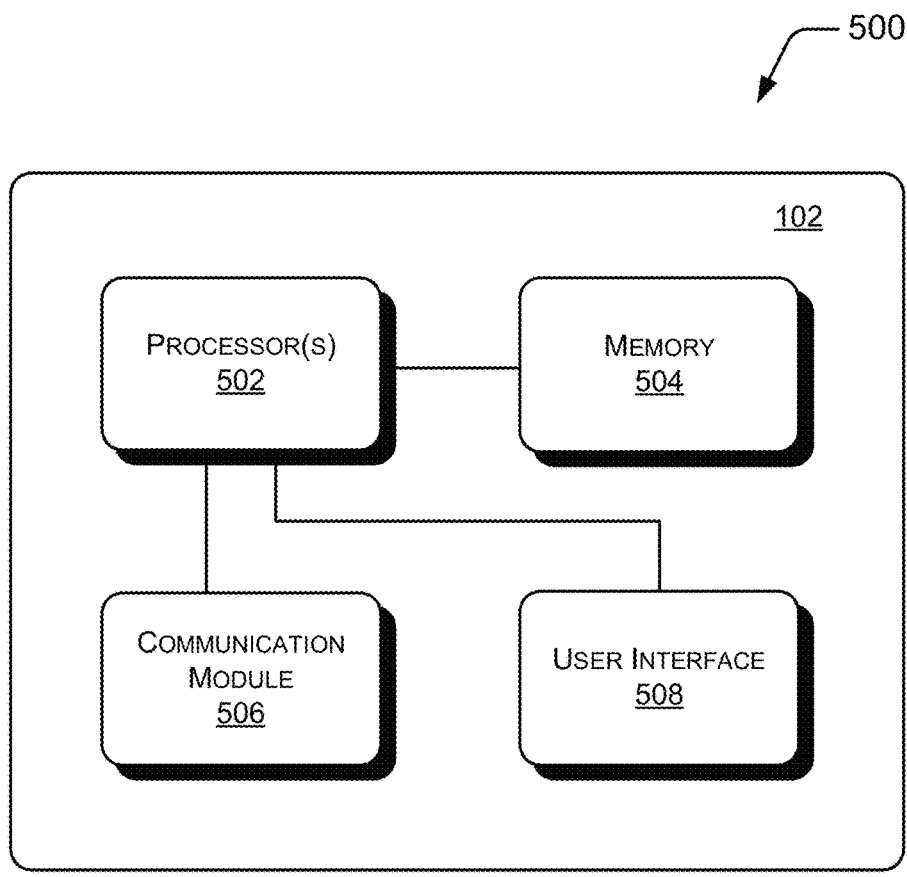
FIG. 5 illustrates an example block diagram of the UE designed migrate from the licensed spectrum of the carrier to the unlicensed spectrum.

FIG. 5 illustrates an example block diagram 500 of the UE 102 designed to be capable of migrating from the licensed spectrum of the carrier to the unlicensed spectrum.

The UE 102 may comprise one or more processors 502 and memory 504 communicatively coupled to the processors 502. The memory 504 may be a non-transitory computer storage medium and may store computer-readable instructions for performing operations described above with reference to FIGS. 2-4 when read and executed by the processors 502. The UE 102 may also comprise a communication module 506, communicatively coupled to the processors 502, capable of establishing communication in the licensed and unlicensed spectra. The communication module 506 may also be utilized when scanning for available neighbor cells in the unlicensed spectrum and for determining the signal quality of the neighbor cell by receiving a signal from the neighbor cell and forwarding information to the processors 502 for analysis and determination. A user interface (UI) 508, communicatively coupled to the processors 502, may receive inputs from a user of the UE 102 and may also provide information to the user. Alternatively, or additionally, the carrier cell 104 may also similarly comprise one or more processors and memory communicatively coupled to the processors. The memory may be a non-transitory computer storage medium and may store computer-readable instructions for performing operations described above with reference to FIGS. 2-4 when read and executed by the processors. The UE 102 and the carrier cell 104, individually or in combination, may also be referred as a system.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for migrating a user equipment operating in a licensed spectrum to an unlicensed spectrum, the method comprising:
    determining that a neighbor cell in the unlicensed spectrum is available;
    determining a type of the available neighbor cell in the unlicensed spectrum;
    determining that a signal quality of the available neighbor cell is below a type-specific predetermined threshold based on the type of the available neighbor cell;
    determining that a carrier-licensed spectrum quality of the licensed spectrum is below a preselected value;
    upon determining that the carrier-licensed spectrum quality of the licensed spectrum is below the preselected value, decrementing the type-specific predetermined threshold by a predetermined value and comparing the signal quality of the available neighbor cell to the decremented type-specific predetermined threshold until the signal quality of the available neighbor cell is equal to or above the decremented type-specific predetermined threshold; and
    upon determining that the signal quality of the available neighbor cell in the unlicensed spectrum is equal to or above the decremented type-specific predetermined threshold, migrating to the available neighbor cell in the unlicensed spectrum.

2. A method of claim 1, wherein determining that the neighbor cell in the unlicensed spectrum is available comprises:
    scanning for available neighbor cells in the unlicensed spectrum;
    if a neighbor cell in the unlicensed spectrum is detected in response to the scanning, determining that the detected neighbor cell is the available neighbor cell; and
    if no available neighbor cell in the unlicensed spectrum is detected in response to the scanning, waiting for a predetermined time period and repeating from the scanning for a predetermined number of times.

3. A method of claim 2, further comprising:
    if no available neighbor cell in the unlicensed spectrum is detected in response to the scanning, and upon determining that the carrier-licensed spectrum quality is below the preselected value, moving to another channel within the carrier-licensed spectrum.

4. A method of claim 1, wherein determining the type of the available neighbor cell in the unlicensed spectrum comprises:
    determining an associated network operator of the available neighbor cell; and
    determining whether the available neighbor cell is a wireless local area network (WLAN) cell.

5. A method of claim 1, wherein the migrating is performed conditionally based on the neighbor cell not being utilized by another user equipment belonging to a same carrier as the user equipment.

6. A method of claim 1, wherein the signal quality of the available neighbor cell comprises a signal-to-noise ratio (SNR) of a detected signal in the unlicensed spectrum from the neighbor cell.

7. A system comprising:
    one or more processors; and
    a computer storage medium coupled to the one or more processors, the computer storage medium storing computer-readable instructions by the one or more processors, that when executed, cause the one or more processors to perform operations comprising:
        determining that a neighbor cell in an unlicensed spectrum is available;
        determining a type of the available neighbor cell in the unlicensed spectrum;
        determining that a signal quality of the available neighbor cell is below a type-specific predetermined threshold based on the type of the available neighbor cell;
        determining that a carrier-licensed spectrum quality is below a preselected value;
        upon determining that the carrier-licensed spectrum quality is below the preselected value, decrementing the type-specific predetermined threshold by a predetermined value and comparing the signal quality of the available neighbor cell to the decremented type-specific predetermined threshold until the signal quality of the available neighbor cell is equal to or above the decremented type-specific predetermined threshold; and upon determining that the available neighbor cell in the unlicensed spectrum is equal to or above the decremented type-specific predetermined threshold, migrating to the available neighbor cell in the unlicensed spectrum.

8. A system of claim 7, wherein determining that the neighbor cell in the unlicensed spectrum is available comprises:

scanning for available neighbor cells in the unlicensed spectrum;

if a neighbor cell in the unlicensed spectrum is detected in response to the scanning, determining that the detected neighbor cell is the available neighbor cell; and if no available neighbor cell in the unlicensed spectrum is detected in response to the scanning, waiting for a predetermined time period and repeating from the scanning step for a predetermined times.

9. A system of claim 8, wherein the operations further comprise:

if no available neighbor cell in the unlicensed spectrum is detected in response to the scanning, and upon determining that the carrier-licensed spectrum quality is below the preselected value, moving to another channel within a carrier-licensed spectrum.

10. A system of claim 7, wherein determining the type of the available neighbor cell in the unlicensed spectrum comprises:

determining an associated network operator of the available neighbor cell; and determining whether the available neighbor cell is a wireless local area network (WLAN) cell.

11. A system of claim 7, wherein the migrating is performed conditionally based on the neighbor cell not being utilized by another user equipment belonging to a same carrier as the user equipment.

12. A system of claim 7, wherein the signal quality of the available neighbor cell comprises a signal-to-noise ratio (SNR) of a detected signal in the unlicensed spectrum from the neighbor cell.

13. A non-transitory computer storage medium configured to store computer-readable instructions by a computer, that when executed, cause the computer to perform operations comprising:

determining that a neighbor cell in an unlicensed spectrum is available including scanning for available neighbor cells in the unlicensed spectrum, and if a neighbor cell in the unlicensed spectrum is detected in response to the scanning, determining that the detected neighbor cell is the available neighbor cell, and if no available neighbor cell in the unlicensed spectrum is detected in response to the scanning, waiting for a predetermined time period and repeating from the scanning step for a predetermined number of times;

determining a type of the available neighbor cell in the unlicensed spectrum;

determining that a signal quality of the available neighbor cell is below a type-specific predetermined threshold based on the type of the available neighbor cell;

determining that a carrier-licensed spectrum quality is below a preselected value;

upon determining that the carrier-licensed spectrum quality is below a preselected value, decrementing the type-specific predetermined threshold by a predetermined value and comparing the signal quality of the available neighbor cell to the decremented type-specific predetermined threshold until the signal quality of the available neighbor cell is equal to or above the decremented type-specific predetermined threshold; and upon determining that the available neighbor cell in the unlicensed spectrum is equal to or above the decremented type-specific predetermined threshold, migrating to the available neighbor cell in the unlicensed spectrum.

14. A non-transitory computer storage medium of claim 13, wherein the operations further comprise:

if no available neighbor cell in the unlicensed spectrum is detected in response to the scanning, and upon determining that the carrier-licensed spectrum quality is below the preselected value, moving to another channel within a carrier-licensed spectrum.

15. A non-transitory computer storage medium of claim 13, wherein the migrating is performed conditionally based on the neighbor cell not being utilized by another user equipment belonging to a same carrier as the user equipment.

* * * * *